April 8, 1958
N. H. RENNER
2,829,924
FORAGE BLOWER
Filed Dec. 14, 1954
3 Sheets-Sheet 2
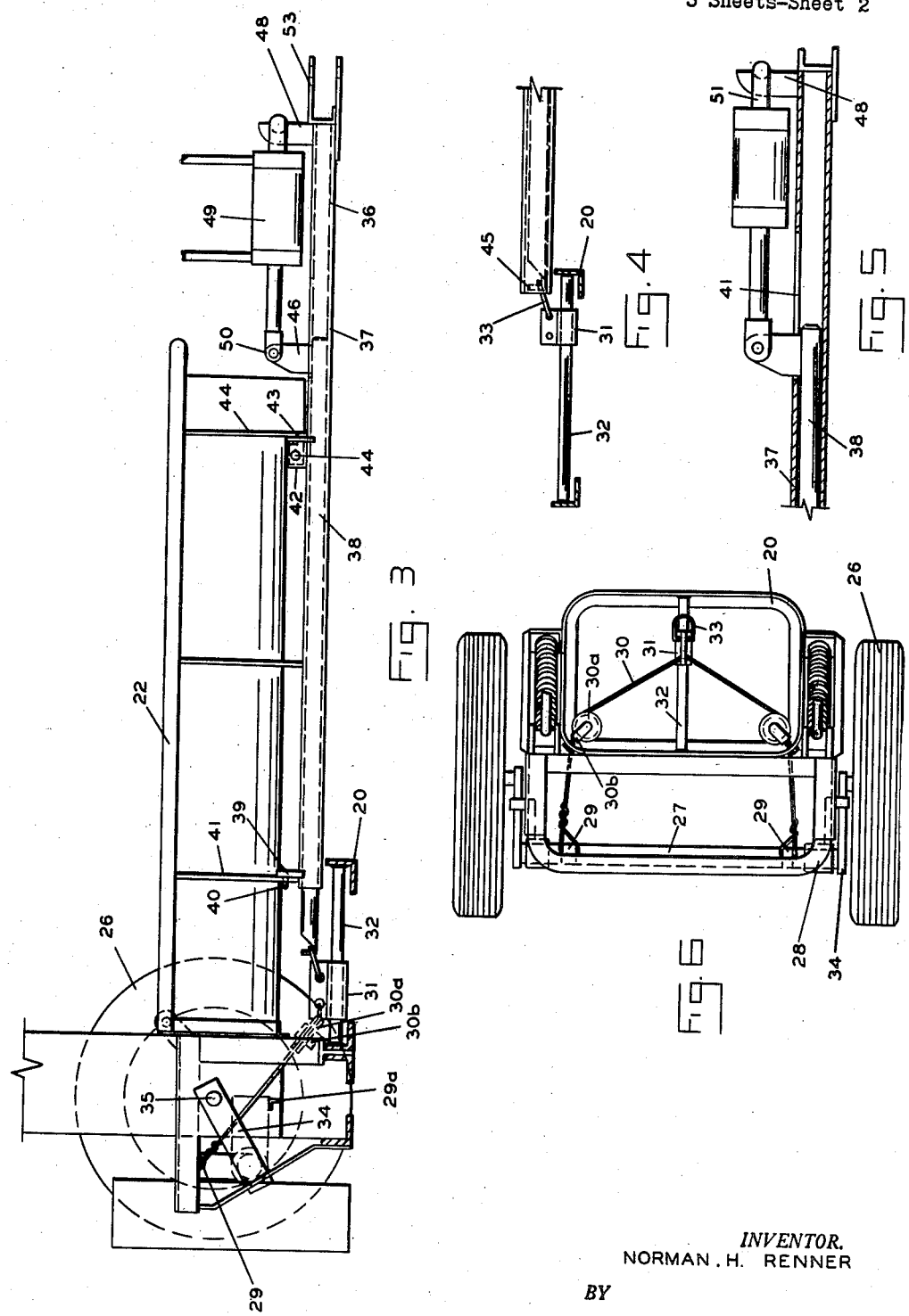
INVENTOR.
NORMAN. H. RENNER
BY
ATTORNEYS April 8, 1958 N. H. RENNER 2,829,924
FORAGE BLOWER
Filed Dec. 14, 1954 3 Sheets-Sheet 3
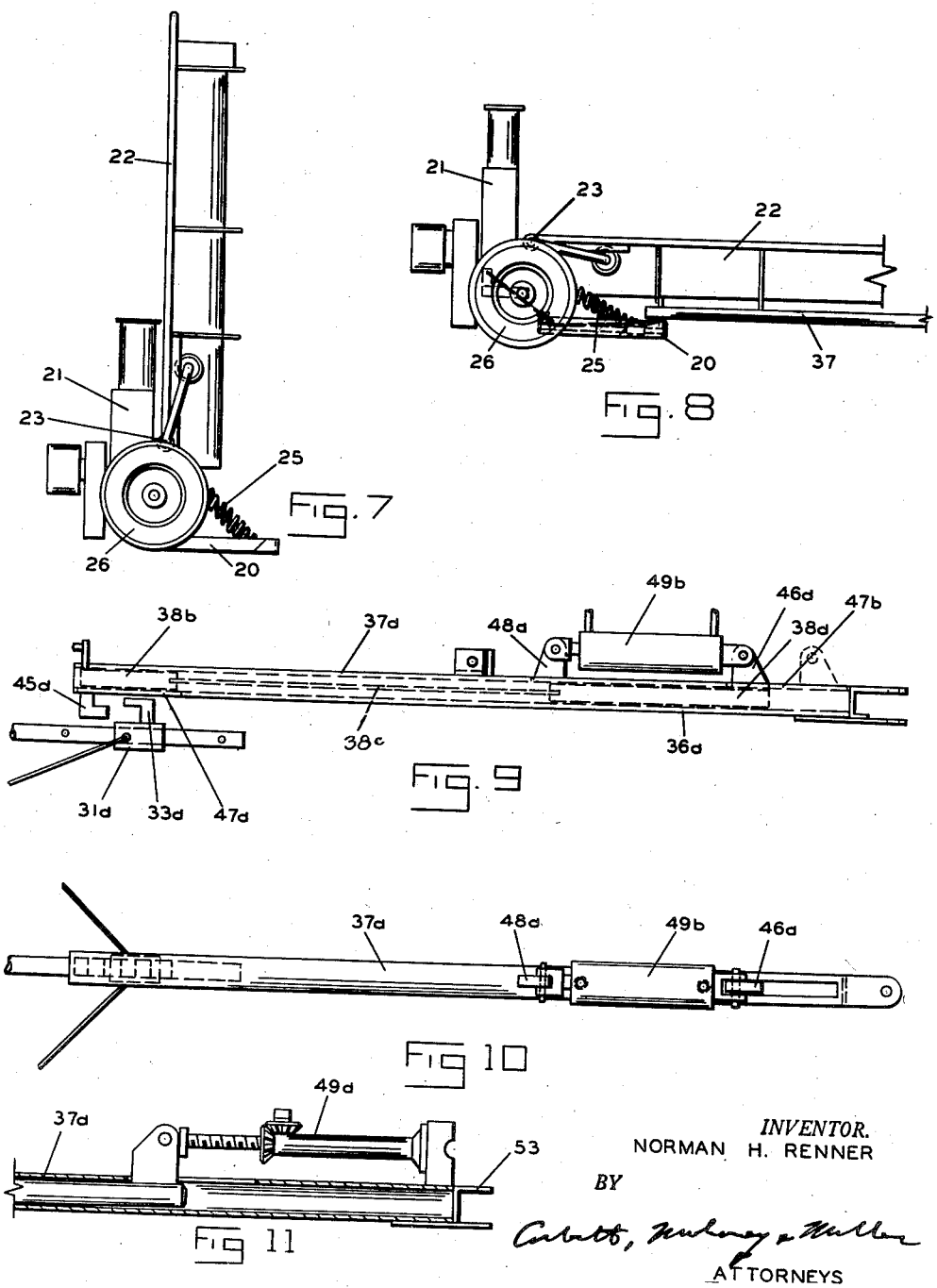
INVENTOR.
NORMAN H. RENNER
BY
ATTORNEYS United States Patent Office 2,829,924
Patented Apr. 8, 1958

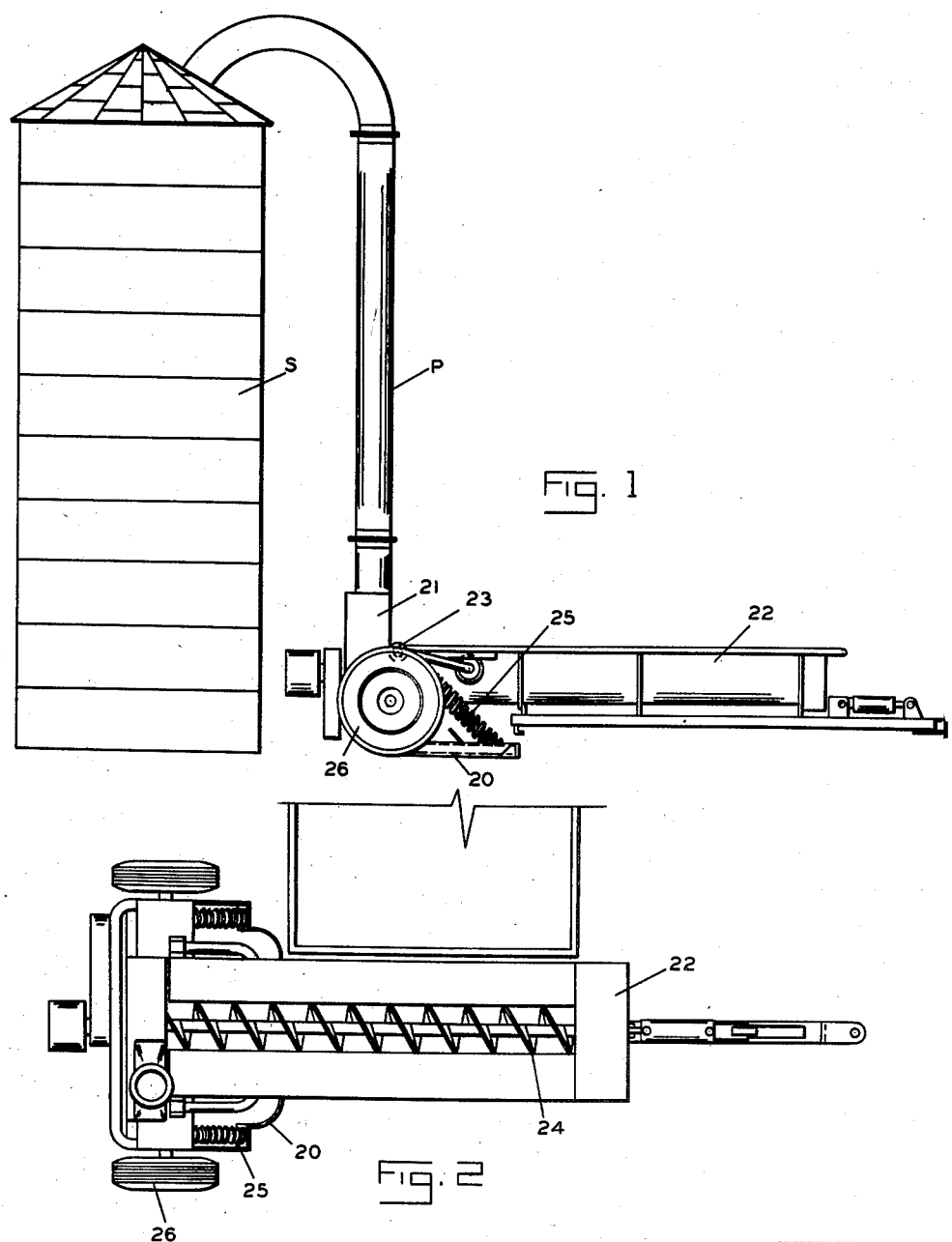

2,829,924

FORAGE BLOWER

Norman H. Renner, Irwin, Ohio, assignor of one-half to William L. Coleman, Marysville, Ohio Application December 14, 1954, Serial No. 475,197

6 Claims. (Cl. 302—37)

My invention relates to a forage blower. It has to do, more specifically, with a portable forage blower of the type used in blowing silage into a silo.

This type of machine comprises a blower at one end to which distributor pipes are connected for conducting the silage to the silo. An auger housing or pan is provided, with an auger operating therein, and this housing extends from the front of the machine to the rear where the blower is located. The machine is supported at its rear or blower end by two wheels and is pulled from its front end by a suitable tongue arrangement. The supporting wheels are adjustably mounted so that they can be manually lowered for supporting the machine for transportation or can be manually raised so that the machine can rest on the ground. The auger housing is pivoted or hinged at the blower end of the machine so that it can be swung up into a vertical position, to permit the passage of a wagon containing the silage, and after passage of the wagon, can be swung down again into horizontal position at which time the silage can be dumped from the rear of the wagon into the housing. When pulling the machine with a tractor, by the tongue at the front thereof, the auger housing must be locked in its lowered position.

This type of machine is relatively heavy. As constructed up to the present time, the adjustment of each of the pair of transporting wheels is independent of the other. Furthermore, these wheels are difficult and dangerous to adjust especially in lowering the wheels into supporting position and locking them for transportation of the machine. As now constructed, each wheel is supported on a hanger and it is necessary to place the end of a stick under the frame with its other end disposed forwardly on the ground. Then the machine must be pulled forwardly slowly by a tractor until the one side of the frame rides up on the stick high enough to permit the wheel at that side to be lowered and to be locked by a hanger bolt in such position. The same operation must be repeated at the other side. Obviously, these are time-consuming, difficult, and dangerous operations. Also, as the machine is now constructed, the auger housing is locked in its lowered position for transporting the machine by means of chain locks between it and the frame and it is necessary to reach below the housing and fasten each chain lock separately. These also are difficult and time-consuming operations.

It is the main object of my invention to provide means for mechanically and simultaneously adjusting both wheels of a machine of the type indicated into transporting position and for simultaneously locking the auger housing in its lowered position.

According to my invention, the two wheels of the forage blower are disposed on the opposed ends of a single axle of the crank arm or eccentric type. By turning this axle, the wheels are both moved simultaneously vertically relative to the frame of the machine between a lower supporting position for transportation and an upper non-supporting position to permit the frame to rest on the ground.

The wheels are moved into their lower supporting position by means of a tongue which is also used for drawing the machine during transportation, and which includes telescoping sections. The telescoping sections are preferably contracted by means of a hydraulic cylinder although a mechanical jack may be used for this purpose.

By a suitable cable arrangement between the telescoping tongue and the crank axle, contraction of the telescoping sections will exert a pull on the cable to rotate the crank axle and thereby lower the wheels into contact with the ground and support the frame thereby. Also, I provide a locking arrangement which will be operated simultaneously with the lowering of the wheels by contraction of the telescoping tongue sections, to lock the auger housing in its lowered position for transportation. Moreover, release of this locking arrangement will be permitted when the telescoping tongue sections are extended to raise the wheels into non-supporting position. When the blower is in use, the tongue can be disconnected and can be completely removed so it will not interfere with the intended use of the machine.

In the accompanying drawings, I have illustrated two embodiments of my invention but it is to be understood that it may take other specific forms without departing from the basic principles thereof. In these drawings:

Figure 1 is a schematic drawing illustrating a forage blower with my invention applied thereto.

Figure 2 is a plan view of the forage blower.

Figure 3 is a side elevational view of the forage blower with the frame resting on the ground.

Figure 4 is a view of the rear end of the tongue illustrating the manner in which the auger housing is locked in lowered position to the frame as the frame is supported by the wheels for transportation of the blower.

Figure 5 is a detail in longitudinal section of the forward part of the telescoping tongue and the actuating mechanism therefor.

Figure 6 is a top plan view of the rear portion of the forage blower with the auger housing removed for clarity.

Figure 7 is a side elevational view of the forage blower with the tongue removed and the auger housing in vertical position.

Figure 8 is a side elevational view with the auger housing in horizontal position locked to the frame and the frame supported by the wheels for transportation.

Figure 9 is a side elevational view of a modified telescoping tongue which can be used in the blower.

Figure 10 is a plan view of the modified tongue.

Figure 11 is a side elevational view of a mechanical jack which can be used instead of the hydraulic cylinder for actuating the telescoping tongue.

With reference to the drawings, in Figures 1 and 2, I have illustrated the general arrangement of a forage blower machine to which my invention may be applied. This blower comprises a main frame 20 which supports a blower 21 that is adapted to blow the silage into an adjacent silo S through the distributor pipes P which are connected to the blower and lead up into the silo as shown in Figure 1. For receiving the silage which is dumped from a wagon or similar vehicle, the machine is provided with the auger housing or pan 22. One end, 20 is the rear end, of this pan is pivoted to the frame about a transverse horizontal axis 23 for movement between the horizontal position shown in Figure 1 and the vertical position shown in Figure 7. In the vertical position, the pan is so located that the wagon can be pulled to a proper position beyond the machine and then the auger housing can be lowered into horizontal position so that it will be positioned transversely of the rear end of the wagon and the contents of the wagon can then be directed into the auger housing. The auger housing has the driven auger 24 disposed longitudinally therein. Counterbalance springs 25 are provided for aiding in raising the auger housing to its vertical position.

The main frame 20 is provided with a pair of wheels 26 which are so supported thereon that they can be adjusted to a lower position (Figure 8) where they support the frame or can be retracted to an upper position (Figures 1 and 7) to permit the frame to rest on the ground. When the machine is in use to blow silage into the silo (Figure 1) the machine, which is relatively heavy, is rested on the ground.

As shown in Figure 6, the wheels 26 are carried on the opposed ends of a crank axle or eccentric axle 27 which is rotatably mounted in the bearings 28 carried at the rear end of the frame 20 on an upstanding part thereof. This axle 27 can be rotated to raise or lower the wheels 26 by means of radially extending rocker arms 29 (Figures 3 and 6) keyed on the axle adjacent the ends thereof. These arms are rocked by means of a cable 30 which has its ends connected to the outer ends of the arms 29. This cable passes downwardly and forwardly around the angularly disposed pulleys 30a which are carried by the lower part of the frame 20. The pulleys 30a are carried by spring and bolt units 30b, the loose bolts and springs allowing sufficient flexibility to prevent binding of the cables in the pulleys. Midway between its ends, the cable 30 is anchored to a sleeve 31 which is slidably mounted on a longitudinally extending rod 32 that is rigidly carried by the lower horizontal forwardly extending part of the frame 20 midway between the sides thereof. The sleeve 31 is provided with a clevis 33 on the upper side thereof. It will be apparent that by pulling the sleeve 31 forwardly on the rod 32, the rocker arms 29 (Figure 3) will be swung forwardly, causing the wheel-supporting crank arms 34 to swing the wheel axes 35 downwardly which, in turn, will cause the wheels to engage the ground and lift the frame 20 from the ground. Forward rocking of the arms 29 is limited by their engagement with stops 29a which are welded to the frame 20. The machine will now be supported by the wheels for transportation. It will be noted from Figure 3 that the wheel-supporting crank arms 34 are in upwardly inclined position when the frame 20 is resting on the ground and the weight of the machine will tend to return them to such position when the pull on the sleeve 31 is released after the machine is supported by the wheels. Thus, when the pull is released, the wheels will be retracted automatically to their upper positions so that the frame will again rest on the ground.

To actuate the sliding sleeve 31, to lock the auger housing 22 in its lower horizontal position for transportation, and to pull the machine along while supported by the wheels 26, I provide the telescoping tongue 36.

This tongue comprises the outer larger tube 37 and the inner smaller tube 38. The outer tube 37 is removably attached to the lower side of the auger housing 22. The attachment is made by means including an upstanding transverse plate 39 welded to the rear end of the tube and which has a rearwardly extending pin 40 that slides rearwardly into an opening in a frame member 41 which is part of the auger housing 22. The sleeve 37, adjacent its forward end, is provided with an axially extending plate 42 which is welded thereto and which cooperates with a T-shaped plate 43, the transverse portion of which is bolted to a frame member 44 of the auger housing 22. The axially extending part of the plate 43 is provided with a transverse bolt hole which aligns with a similar hole in the plate 42 for receiving a transverse locking bolt 44. The transverse part of the plate 43 engages the forward end of the plate 42 to take the thrust developed when a pull is applied to the forward end of the tongue 36. It will be apparent that the tongue can be removed readily merely by removing the bolt 44, dropping the forward end of the tongue, and then pulling the tongue forwardly to withdraw the pin 40 from the frame member 41.

The tube 38 is slidably mounted in the tube 37 and extends rearwardly therefrom. Its rear end is provided with an upstanding hook 45 which is small enough that it can be pulled into the rear end of the tube 36. This hook is adapted to receive the clevis 33. It will be apparent from Figure 3 that the forward part of the frame 20 is just slightly below the level of the tongue 36, when attached to the auger housing 22, so that when the tube 38 is moved to its rearwardmost position, the clevis 33 can be swung forwardly over the hook 45. When the hook 45 is then pulled forwardly into the sleeve 37, the clevis, which is small enough to enter the tube 38, will be locked in position on the hook and, therefore, the auger housing 22 will be locked in its lower horizontal position to the frame 20.

To move the tube 38 axially of the tube 37, the forward end of the tube 38 is provided with an upstanding bracket 46 welded thereto and which projects upwardly through a longitudinal slot 47 in the forward end of the tube 37 ahead of the housing 22. The extreme forward end of the tube 37 is provided with a similar upstanding bracket 48 welded thereto. Between the brackets 46 and 48, I preferably provide a hydraulic cylinder and piston unit 49. The piston rod of this unit is provided with a yoke at its rear end which straddles the bracket 46 and is connected thereto by a removable transverse bolt 50. The cylinder of this unit at its other end is provided with a yoke 51 which slips over the upper end of the bracket 48 and engages with a notch formed in the forward side thereof. It will be apparent that when the unit 49 is controlled to pull the brackets 46 and 48 towards each other, the tube 38 will be pulled forwardly into the tube 37 to lower the wheels 26 for transportation and to simultaneously lock the auger housing 22 in its lower horizontal position.

The hydraulic unit 49 is usually provided as an attachment on a farm tractor and is controlled therefrom. However, instead of this hydraulic unit, a mechanical jack of the type shown at 49a in Figure 11 may be provided. This jack may be of the worm and screw type, or any other suitable type, and may be actuated by a crank (not shown).

The extreme forward end of the tube 37 is further provided with a hitch 53 by means of which the tongue 36 can be hitched to the drawbar of a tractor.

In Figures 9 and 10, I have illustrated a modified tongue 36a which will function substantially the same as the tongue 36 but is of somewhat different detailed structure. The outer tube 37a is provided with means substantially as before for attaching it to the bottom of the auger housing. Slidably within the section 37a are the forward and reverse sections 38a and 38b, respectively, which are connected together by a tension bar 38c. The rear section 38b is provided with a depending forwardly directed hook 45a which depends through a slot 47a in the lower side of the tube 37a. This hook is adapted to engage the rearwardly directed upstanding hook 33a carried on the slidable sleeve 31a on the machine frame. After the tongue 36a is positioned on the auger housing, a forward pull on the section 38b will cause the hook 45a to engage the hook 33a thereby locking the auger housing to the frame as well as moving the wheels to machine supporting or transporting position. Forward movement of the hook 45a is accomplished by means of the hydraulic unit 49b or a mechanical jack unit of the type shown in Figure 11. The unit 49b is connected between a rear upstanding bracket 48a on the tube 37a and an upstanding forward bracket 46a on the section 38a which projects up through a slot 47b in the forward end of the tube 37a. Actuation of the unit 49b will move the section 38a forwardly in the tube 37a and will, therefore, move the connected section 45a forwardly to engage the hook 33a.

With both forms of the actuating tongue, it can be removed easily and quickly when the machine is supported on the ground near a silo. The auger housing can be raised and a wagon or other vehicle can move past the machine and then the housing can be swung into horizontal position to receive the material. When the machine is to be moved, the housing is moved into horizontal position and the tongue can then be actuated to lower the wheels into supporting position and to simultaneously lock the housing in its lower horizontal position.

Having thus described my invention, what I claim is:

1. In a forage blower, a frame, wheels on the frame mounted for movement between supporting and non-supporting positions, a conveyor housing pivoted to the frame for movement between a horizontal and a vertical position, actuating means for moving the wheels simultaneously to supporting position and for simultaneously locking the conveyor housing to the frame in a horizontal position, said wheels comprising a pair of wheels mounted on the frame by means of a crank axle, said actuating means comprising a tongue by which the machine is moved and which includes a movable section, and means for operatively connecting said movable section to said crank axle to cause rotation of it upon movement of said section.

2. In a forage blower, a frame, wheels carried by a crank axle rotatably mounted on the frame, rocker arms on the crank axle by means of which it may be rotated to move the wheels between supporting and non-supporting positions, a conveyor housing pivoted on the frame for movement between horizontal and vertical positions, a slide on the frame having a slide member mounted thereon, means for connecting said slide member to the rocker arms so that movement of the slide member rocks the arms, slidable actuating means mounted on the housing and connected to said slide member, said last-named means comprising a tongue mounted on the conveyor housing, said tongue having a movable section which is connected to said slide member, means for moving said section, and means on the tongue for locking it to the frame, thereby locking the housing to the frame.

3. The combination of claim 2 in which the tongue is composed of telescoping sections including said movable section and means connected between said sections for extending or contracting them.

4. The combination of claim 3 in which the tongue is removably mounted on the conveyor housing.

5. The combination of claim 3 in which the locking means comprises a clevis carried by the slide member and a hook carried on an end of the movable section of the tongue which projects rearwardly from the tongue, and a clevis carried by the slide member, the clevis and hook being movable with the movable section into the cooperating section of the telescoping tongue.

6. The combination of claim 3 in which the locking means comprises a hook on the movable section of the tongue which engages a hook carried by the slide member on the frame.

References Cited in the file of this patent

UNITED STATES PATENTS

| | | |
|---|---|---|
| 536,645 | McCollough | Apr. 2, 1895 |
| 2,588,711 | Everett | Mar. 11, 1952 |
| 2,591,411 | Delsman | Apr. 1, 1952 |
| 2,616,765 | Hill | Nov. 4, 1952 |
| 2,691,551 | Zollars | Oct. 12, 1954 |
| 2,698,770 | Van Sickle | Jan. 4, 1955 |